United States Patent [19]

Burrus

[11] 4,429,464
[45] Feb. 7, 1984

[54] ROUNDNESS CALIBRATION STANDARD

[76] Inventor: Brice M. Burrus, 6620 Wachese La., Knoxville, Tenn. 37912

[21] Appl. No.: 343,804

[22] Filed: Jan. 29, 1982

[51] Int. Cl.³ .............................................. G01B 5/28
[52] U.S. Cl. .............................. 33/174 Q; 33/168 R; 33/178 R; 73/1 J
[58] Field of Search ............ 33/178 R, 168 R, 174 Q, 33/174 L, 172 D, 169 C; 73/1 R, 1 E, 1 J

[56] References Cited

U.S. PATENT DOCUMENTS 3,180,031  4/1965  Roeger et al. ................... 33/174 Q
3,866,829  2/1975  Egawa et al. .................... 33/174 Q

FOREIGN PATENT DOCUMENTS 311434  3/1919  Fed. Rep. of Germany .... 33/168 R
716337  10/1931  France ............................. 33/168 R

*Primary Examiner*—William D. Martin, Jr.
*Attorney, Agent, or Firm*—Edwin D. Grant; Stephen D. Hamel; Richard G. Besha

[57] ABSTRACT

A roundness calibration standard is provided with a first arc constituting the major portion of a circle and a second arc lying between the remainder of the circle and the chord extending between the ends of said first arc.

1 Claim, 3 Drawing Figures

U.S. Patent  Feb. 7, 1984  4,429,464
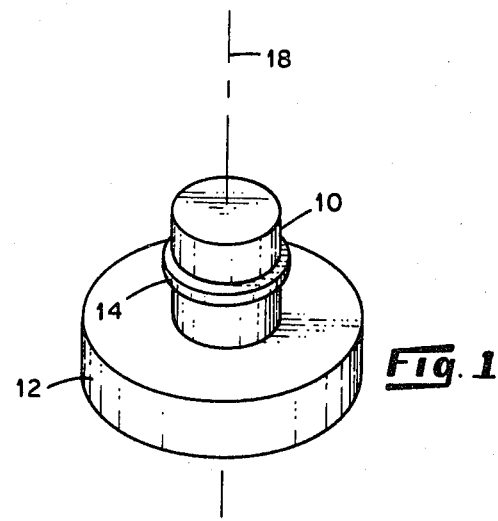
Fig.1
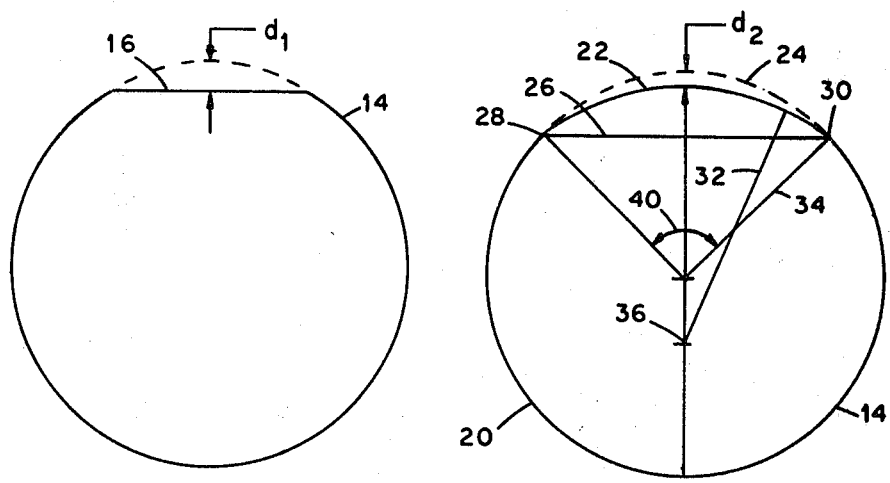
Fig.2
PRIOR ART
Fig.3

ROUNDNESS CALIBRATION STANDARD

BACKGROUND OF THE INVENTION

This invention, which resulted from a contract with the U.S. Department of Energy, relates to a calibration means. More particularly, the invention relates to a standard having a perimeter with a precise out-of-round configuration that can be used to more accurately calibrate roundness testing machines than has been possible with conventional calibration standards.

For several decades laboratories throughout the world have set the readout of roundness testing machines by use of precisely machined cylindrical standards each having a narrow flat surface extending lengthwise thereof. As will be shown in further detail hereinafter, it has been determined that this type of roundness standard is not suitable for calibrating test machines that measure deviations from roundness in microinches.

SUMMARY OF THE INVENTION

It is therefore an object of this invention to provide a new perimetric configuration for roundness calibration standards that makes it possible to more precisely establish the accuracy of roundness checking machines.

Another object of the invention is to provide an improved perimetric configuration for roundness calibration standards that can be formed with precision by use of available machine tools.

These objects and other advantages are achieved by a roundness calibration standard having a perimeter bounded by (1) a first arc constituting a major portion of a circle, and (2) a second arc lying between the remainder of said circle and the chord of said circle which extends between the ends of said first arc. In one preferred embodiment of the invention, the aforesaid second arc is a circular arc having a radius of curvature larger than the radius of curvature of said first arc.

DESCRIPTION OF THE DRAWINGS

FIG. 1 is a pictorial view of a roundness calibration standard of the type which is used to check the accuracy of a roundness checking machine and which can advantageously have a calibration perimeter formed in accordance with the principles of this invention.

FIG. 2 is a cross section of a roundness calibration standard of the prior art. The section shown extends through the reference surface of a standard of the type illustrated in FIG. 1 and is perpendicular to the cylindrical axis thereof.

FIG. 3 is a cross section of a roundness calibration standard having a perimeter formed in accordance with principles of the invention.

DETAILED DESCRIPTION OF THE INVENTION

As is well known by persons who work in the dimensional measurement field of quality control, when the roundness of an item is checked by means of a roundness testing machine, the item is held in a holding fixture on a work table with its central axis in a vertical position. Some roundness measuring machines have a rotating table on which a test piece rests, and the test piece is rotated while in contact with a stationary electronic probe. In other roundness measuring machines, an electronic gage head carried on the lower end of a spindle is adjusted to place a stylus associated therewith in contact with the surface of the circular item, and the spindle is rotated so that the stylus traces around the tested surface. The radial distance of the surface from the rotational axis is transmitted as an electrical signal to an amplifier and graphically recorded on a polar chart. Consequently a departure of the surface of the tested item from a perfect circle can easily be determined by reading the graphical deviation of the trace curve from a circle on the polar chart. Normally several magnification scales are available.

FIG. 1 illustrates a roundness calibration standard having the general shape of both a prior art standard and a standard having the improved configuration disclosed herein, the two standards differing in cross-sectional form as illustrated in FIGS. 2 and 3 (wherein measurements are exaggerated for clarity) but this difference in form not being observable on a standard drawn to the scale of FIG. 1. The prior art standard and a standard constructed in accordance with principles of this invention may include a cylindrical post 10, a base 12 integrally joined to one end of the post, and a shoulder 14 which provides the critical reference surface and projects from and extends around the middle portion of the post. The outer surface of shoulder 14 is made as round as possible and, in the case of the previously known standard illustrated in FIG. 2, a narrow flat surface 16 is formed on this surface in parallel relation with the central axis 18 of post 10 and the shoulder. In FIG. 2, the deviation of the perimeter of shoulder 14 from a perfect circle is represented by reference letter $d_1$, and this known distance should be indicated as the readout of a roundness testing machine that is calibrated by means of a standard of the type described to this point. However, as will be shown by test data presented hereinafter, a roundness calibration standard formed with a flat surface 16 introduces errors into the readout of a roundness testing machine used to measure out-of-roundness in microinches.

FIG. 3 shows the cross-sectional configuration of a preferred embodiment of the invention, this configuration being formed on a shoulder 14 circumscribing post 10 as illustrated in FIG. 1. It can be seen in FIG. 3 that the perimeter of shoulder 14 in the preferred embodiment of the invention is bounded by (1) a first arc 20 constituting a major portion of a circle, namely, 270° of a circle in the illustrated embodiment, and (2) a second arc 22 lying between the remainder 24 of said circle and the chord 26 of said circle which extends between the ends 28,30 of said first arc 20. To facilitate forming the cross-sectional configuration with great precision with widely available machine tools, arc 22 is preferably a circular arc having a radius of curvature 32 larger than the radius of curvature 34 of the circular arc. Radius of curvature 22 extends from a point 36 spaced a predetermined distance from the center of circular arc 20 along a diameter 38 of the circular arc which bisects chord 26. The angle 40 subtended by chord 26 is illustrated as 90° in FIG. 3 but may be larger or smaller in other embodiments of the invention. It will be recognized that the distance designated $d_2$ in FIG. 3 is the deviation of the perimeter defined by first and second arcs 20 and 22 from a perfect circle.

It has been found that a conventional roundness standard formed with a flat on its otherwise cylindrical calibration surface (as illustrated in FIG. 2) introduces errors in readouts of a roundness testing machine calibrated therewith when roundness is being measured in microinches This deficiency in such standards was cogently demonstrated by a test conducted with an old type roundness standard and a standard of the new type disclosed herein (i.e., a standard having the perimetric configuration of the type illustrated in FIG. 3). More specifically, in one test of a conventional standard the radius of curvature of shoulder 14 of the standard was approximately 0.375 inches and the flat surface 16 formed on the shoulder was such that $d_1$ was 92 microinches. The first arc 20 of an embodiment of the invention which was compared with the conventional standard had the same radius of curvature of 0.375 inches and second arc 22 thereof had a radius of curvature such that $d_2$ was 54 microinches. A roundness testing machine was calibrated with the conventional standard having the flat calibration surface as described, and then the same machine was used to measure the out-of-roundness of the standard having the calibration surface of the type illustrated in FIG. 3. The machine indicated a roundness deviation of 49 microinches for the described FIG. 3 type standard, an error approximately 10% less than its true roundness deviation of 54 microinches. Any part checked on the machine calibrated by the old type standard would of course have a corresponding 5 microinch measurement error. It is believed that the measurement error introduced into the readout of a roundness testing machine by calibration with a standard having a flat surface formed thereon is caused by the abrupt deviation of the flat surface (i.e., chord 26 in FIG. 2) from true roundness. The aforementioned stylus which traces the tested surface is rapidly accelerated in a direction disposed essentially 90° relative to axis 18 as it enters the chordal depression of the old type standard, then the stylus is rapidly decelerated and immediately thereafter rapidly accelerated at the midpoint of the chordal depression, and finally the stylus is again rapidly decelerated at the end of the chordal depression. The inertia of the stylus during these rapid changes in its acceleration and deceleration apparently causes changes in the pressure between the stylus and the surface being traced, which in turn causes the transmission of erroneous electric signals to the readout section of a roundness testing machine. On the other hand, a roundness standard having a roundness deviation $d_2$ produced by a smooth arc 22 as illustrated in FIG. 3 does not cause a stylus to rapidly accelerate and decelerate as it travels along this arc, and measurement errors are thus eliminated.

It is possible to make various changes in the embodiment of the invention which has been illustrated in FIG. 3 by way of example. For instance, second arc 22 may be a smooth curve that is not a radius of a circle. Hence the scope of the invention should be considered as being limited only by the terms of the appended claims.

What is claimed is:

1. In a roundness calibration standard formed on its perimeter with (1) a cylindrical surface and (2) an out-of-round calibration surface, the improvement comprising:

said calibration surface being a cylindrical surface with a radius of curvature greater than the radius of curvature of the remainder of the perimeter of said calibration standard.

* * * * *